United States Patent
Grayson

(10) Patent No.: US 12,352,390 B1
(45) Date of Patent: Jul. 8, 2025

(54) DIFFUSER FOR RECIRCULATED LIQUIDS

(71) Applicant: Blue Origin Manufacturing, LLC, Huntsville, AL (US)

(72) Inventor: Gary D. Grayson, Maple Valley, WA (US)

(73) Assignee: Blue Origin Manufacturing, LLC, Huntsville, AL (US)

( * ) Notice: Subject to any disclaimer, the term of this patent is extended or adjusted under 35 U.S.C. 154(b) by 703 days.

(21) Appl. No.: 17/651,502

(22) Filed: Feb. 17, 2022

(51) Int. Cl.
*B01D 19/00* (2006.01)
*F17C 13/12* (2006.01)

(52) U.S. Cl.
CPC ........ *F17C 13/126* (2013.01); *B01D 19/0042* (2013.01); *F17C 2205/035* (2013.01); *F17C 2205/0352* (2013.01); *F17C 2221/011* (2013.01); *F17C 2221/012* (2013.01); *F17C 2260/02* (2013.01); *F17C 2270/0197* (2013.01); *F17C 2270/025* (2013.01)

(58) Field of Classification Search
CPC .............. F17C 13/126; F17C 2205/035; F17C 2205/0352; F17C 2221/011; F17C 2221/012; F17C 2260/02; F17C 2270/0197; F17C 2270/025; B01D 19/02
USPC ......... 96/178, 155, 188, 189, 204, 206, 220; 244/172.2; 55/440, 462
See application file for complete search history.

(56) References Cited

U.S. PATENT DOCUMENTS

| | | | |
|---|---|---|---|
| 2,642,949 A * | 6/1953 | Tyskewicz | F01P 11/06 96/211 |
| 2,976,954 A * | 3/1961 | Irwin | B01D 45/08 55/440 |
| 3,405,511 A * | 10/1968 | Halter | B01D 45/08 55/440 |
| 3,616,623 A * | 11/1971 | Reid | B01D 45/08 55/440 |
| 3,923,188 A | 12/1975 | Lake, Jr. | |
| 4,352,683 A * | 10/1982 | Vogel | B01D 19/00 96/197 |
| 4,733,531 A | 3/1988 | Grove | |
| 4,901,762 A | 2/1990 | Miller, Jr. et al. | |
| 5,334,239 A * | 8/1994 | Choe | B01D 19/0031 96/219 |
| 5,901,557 A | 5/1999 | Grayson | |
| 6,321,726 B1 * | 11/2001 | Khami | F02M 25/0854 55/385.3 |
| 6,432,178 B2 * | 8/2002 | Lichon | B01D 19/0031 96/219 |
| 6,470,926 B1 | 10/2002 | Lak et al. | |
| 6,840,275 B2 | 1/2005 | Grayson | |
| 10,065,751 B2 | 9/2018 | Kawahara et al. | |
| 2007/0044437 A1 * | 3/2007 | Larnholm | B01D 50/20 55/319 |
| 2010/0264275 A1 * | 10/2010 | Behruzi | F02K 9/605 96/178 |

* cited by examiner

*Primary Examiner* — Frank M Lawrence, Jr.
(74) *Attorney, Agent, or Firm* — Summit Patents PC

(57) ABSTRACT

A diffuser for separating a gas component and a liquid component of a liquid-gas mixture to reduce slosh in vehicle systems is described herein. The diffuser includes a wall with a gas end, a liquid end, and multiple vanes partially extending from the liquid side to the gas side. The vanes are spaced apart from each other by a given distance to permit the liquid to flow toward the liquid end via capillary action.

24 Claims, 5 Drawing Sheets

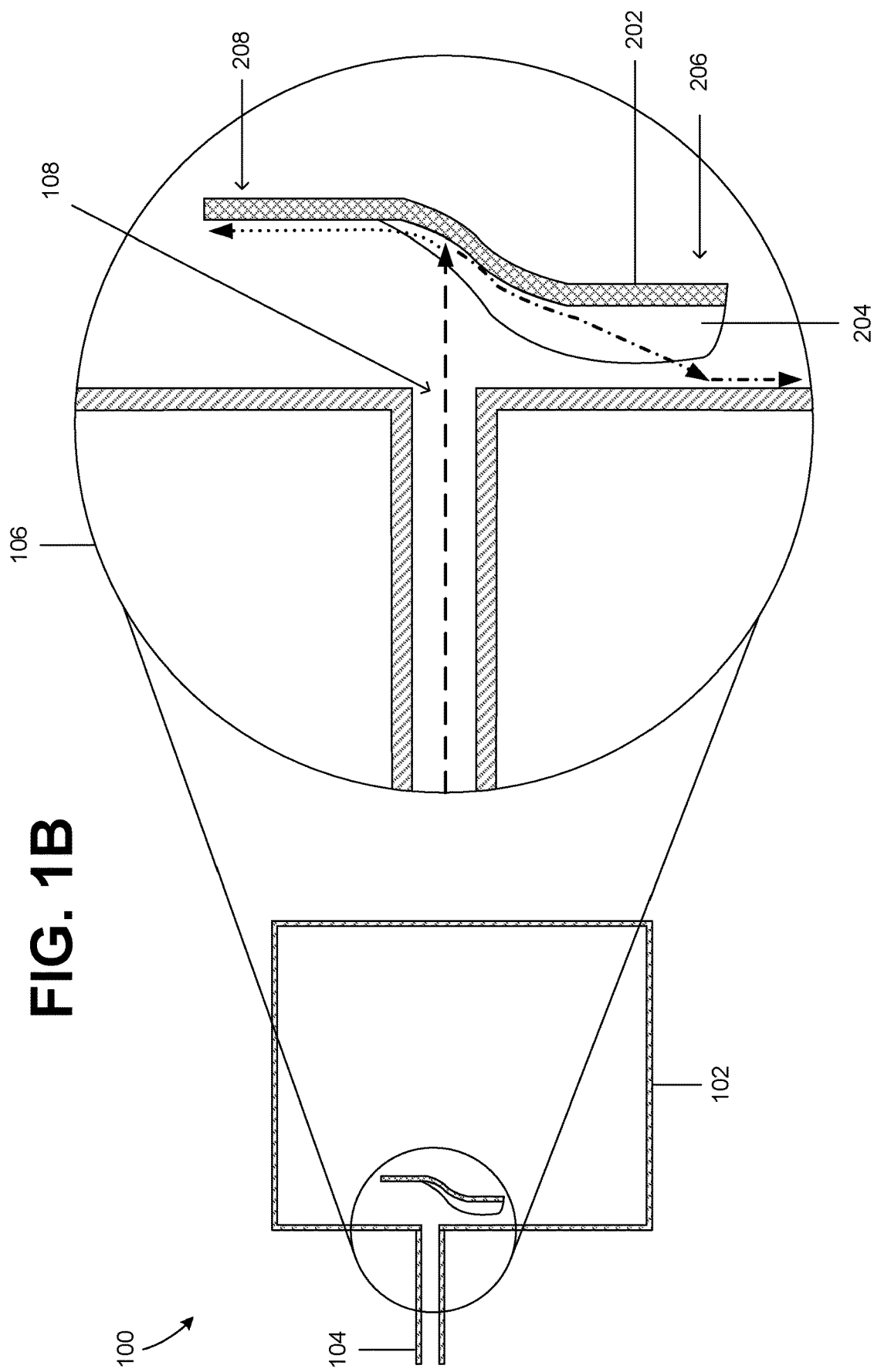

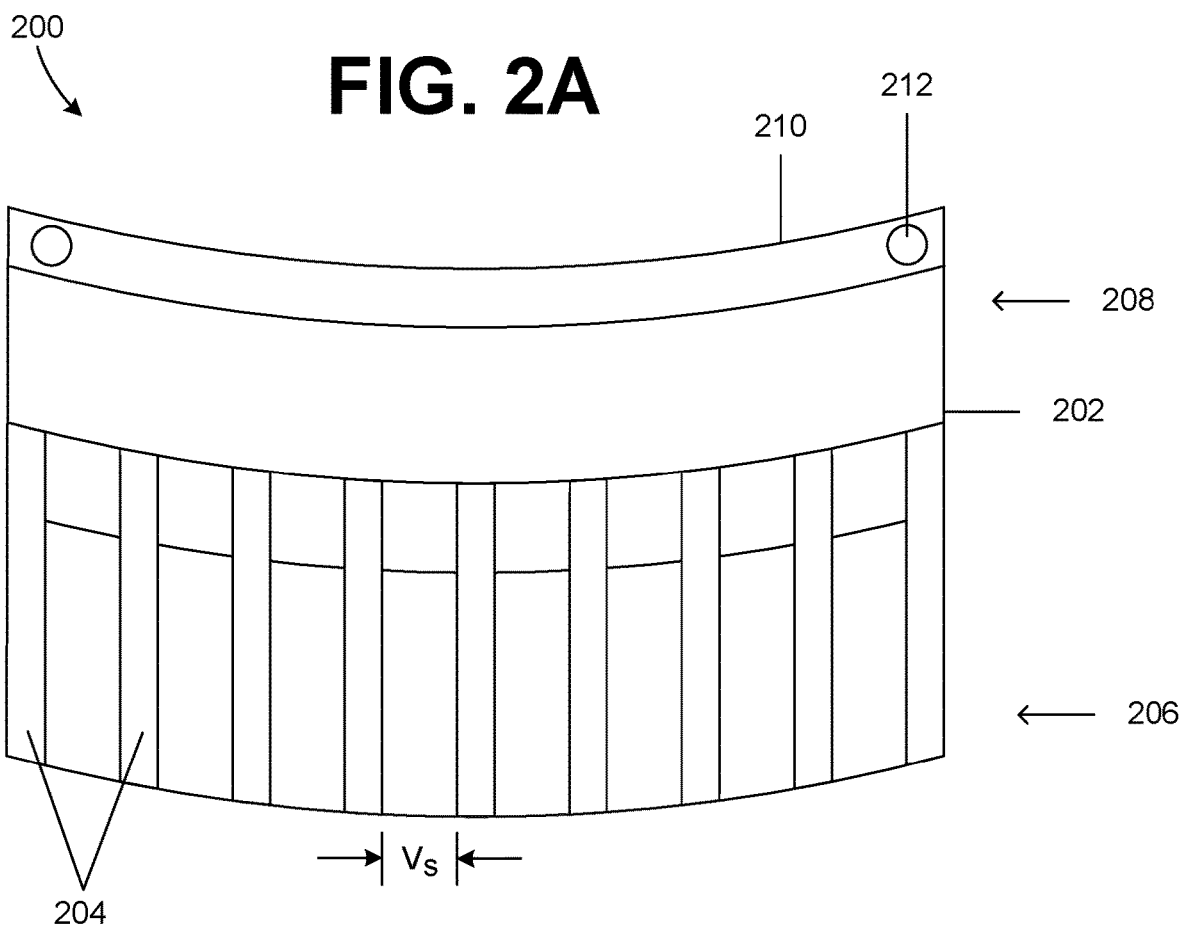
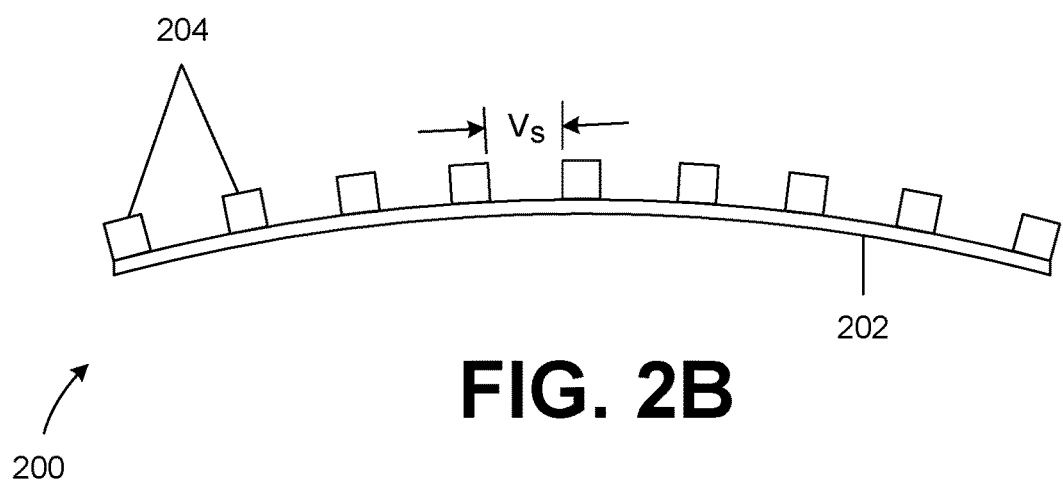

DIFFUSER FOR RECIRCULATED LIQUIDS

BACKGROUND

Liquids are often used as propellants in propulsion system systems on many vehicles such as rockets, spacecraft, aircraft, underwater vehicles, and ground transportation. Quite often, the liquid propellant sloshes within the tanks posing challenges to liquid acquisition and, in the case of cryogenic liquid propellants, thermodynamic challenges due to heat transfer between of the cold liquids and warmer pressurant gases within the tank. Minimization of slosh is frequently required in propellant tank and vehicle designs. Additionally, other liquids like liquid oxygen ($O_2$) for breathing gases in spacecraft and liquid $O_2$ and hydrogen ($H_2$) in liquid tanks for fuel cells experience slosh in a similar manner.

One complicating feature to some liquid tanks is the presence of a liquid recirculation system that pumps liquids from one part of the tank and injects it into another area of the tank. Recirculation systems are more common in cryogenic applications where it is used to redistribute warm liquids into the colder bulk liquid to reduce liquid temperatures near a tank drain. If cryogenic propellant is too warm or of too low pressure, the engine may be unable to start or operate.

An issue with the recirculation system is that the return flow into the tank often causes additional slosh. This is most problematic when the tank is almost empty and near end of use—what little liquid remains can be easily disturbed by the return flow. To confound design challenges further at end of tank use, the tank may be in a low-gravity acceleration environment and so the liquid can be severely displaced by slosh events since there is no significant acceleration to hold the liquid against the bottom of the tank.

The art would benefit from a means to minimize return flow slosh caused by liquid recirculation systems.

BRIEF DESCRIPTION OF THE DRAWINGS

FIG. 1B illustrates a cross-section of the liquid tank, return line, and example diffuser shown in FIG. 1A.

FIG. 2A illustrates a vane side of a wall of the example diffuser.

FIG. 2B illustrates a liquid end view of the example diffuser.

DETAILED DESCRIPTION

A diffuser for reducing slosh of a injected liquid into a tank, such as propellant injected into a propellant tank of a rocket propulsion system, liquid $O_2$ injected into a breathing gas tank for spacecraft, or liquid $O_2$ and $H_2$ injected into respective tanks for fuel spacecraft fuel cells is described herein. The diffuser can also be used to separate a gas component and a liquid component from a two-phase (liquid and gas) mixture within a recirculation system. The diffuser includes a wall with a gas end, a liquid end, and multiple vanes partially extending from the liquid side to the gas side. The vanes are spaced apart from each other by a given distance to permit the liquid to flow toward the liquid end via capillary action.

The diffuser can reduce slosh by slowing injected recirculation flows directing them down the tank wall into the liquid in a more gentle controlled manner than simply flowing from an uncovered port towards the center of the bulk liquid surface. By separating incoming two-phase flows into a liquid component directed downward and gas component upward, slosh is further reduced due to fewer bubbles in the fluid flowing into the bulk liquid in the tank.

Figure 1A:
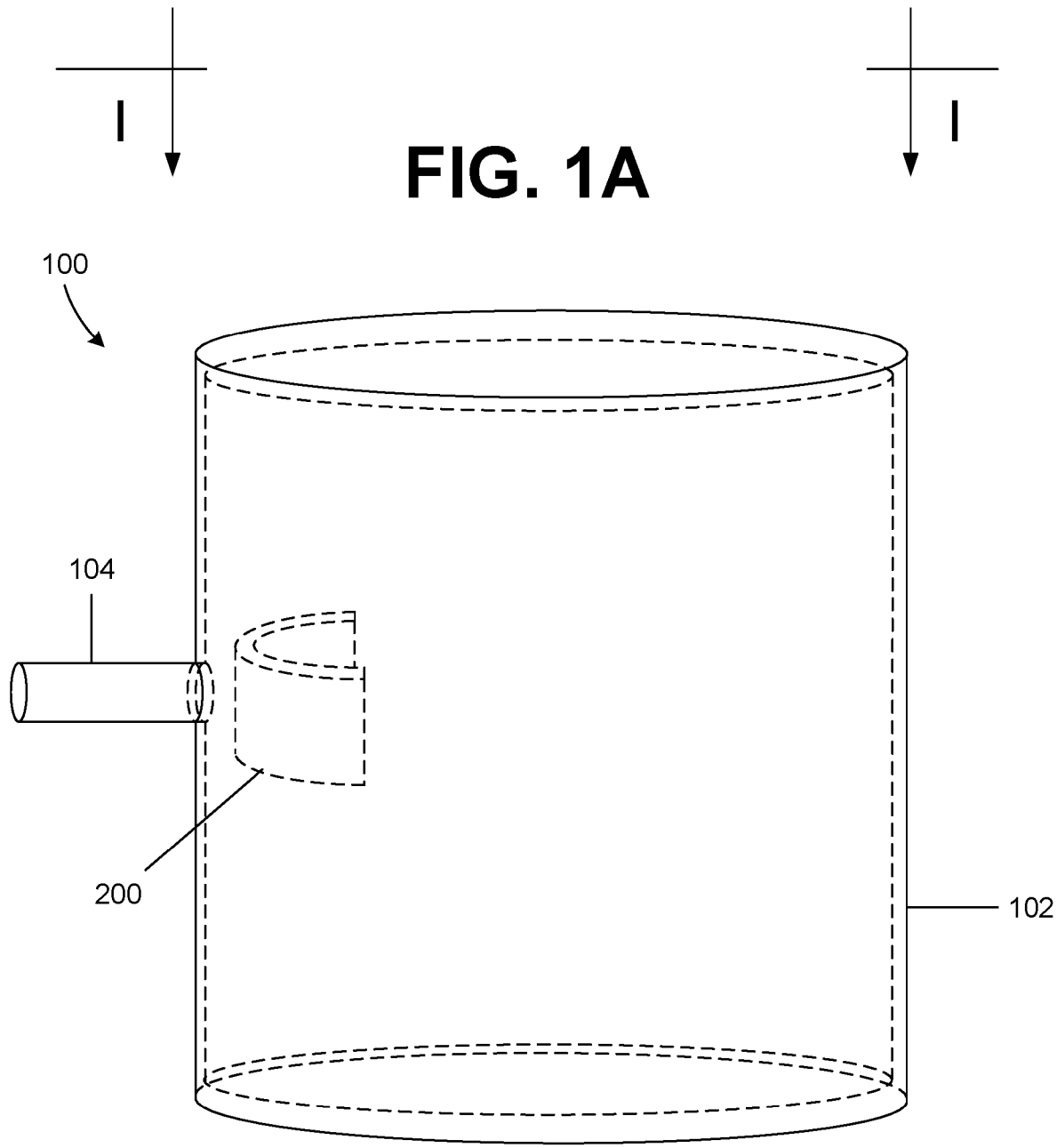
FIG. 1A illustrates a portion of a liquid tank with a return line and an example diffuser.

The diffuser can be used in a propulsion system for a rocket or spacecraft that may be in any acceleration environment including low-gravity in space FIG. 1A shows a portion of a liquid tank 100, such as a propellant tank of a propulsion system for a rocket, a liquid $O_2$ tank for breathing gas in a spacecraft, or a liquid $O_2$ or $H_2$ tank for fuel cells. The portion of the liquid tank 100 includes a liquid tank 102 having a return line 104 and a diffuser 200. FIG. 1B shows a cross-section view of the liquid tank 102, the return line 104, and the diffuser 200 taken along line I-I. The diffuser 200 is located near or proximal to a return line inlet 108 (e.g., an opening) of the liquid tank 102 and includes a wall 202 having a gas end 208 and a liquid end 206. The diffuser 200 also includes multiple vanes 204 extending outwardly from the wall 200 and partially extending from the liquid end 206 to the gas end 208. The diffuser 200 is placed in front of the return line inlet 108 and oriented such that the vanes 204 face the return line inlet 108.

In one example, the size of the diffuser 200 is equal to the size of the return line inlet 108, such that the return line inlet 108 is covered by the entirety of the diffuser 200. This permits the diffuser 200 to reduce sloshing by acting as a barrier to attenuate the amplitude and amount of waves generated by liquid movement, separate the gas and liquid components of the liquid-gas mixture-such as the propellant-gas mixture or an oxidizer-gas mixture of a propellant tank or oxidizer tank, respectively, in a rocket engine-returned to the tank 102 (i.e., such as by matching the area of return line inlet 108 and the frontal area of the liquid-gas mixture stream being expelled therefrom), or both, while adding as little mass as possible to the overall load of the rocket. For example, when the return line inlet 108 is 100 mm by 200 mm, the diffuser 200 is 100 mm by 200 mm.

In another example, the size of the diffuser 200 is larger than the return line inlet 108, such that the return line inlet 108 is covered by a portion of the diffuser 200. For example, the diffuser 200 can be up to two times larger than the return line inlet. This permits the diffuser 200 to reduce sloshing by acting as a barrier to attenuate the amplitude and amount of waves generated by liquid movement, separate the gas and liquid components of the liquid-gas mixture returned to the tank 102, or both. The diffuser 200 being larger than the return line inlet can, for example, inhibit the liquid-gas mixture, if any, from flowing around or avoiding the diffuser 200 upon expulsion from the return line inlet.

As seen in FIGS. 2A-2D, the diffuser 200 includes multiple vanes 204. Successive or consecutive vanes are spaced apart by a space Vs. The space Vs permits the liquid of the liquid-gas mixture to flow toward the liquid end 206 via capillary action. Therefore, the space Vs can be set based on one or more characteristic of the liquid, including, without limitation, surface tension, polarity, combinations thereof, and the like. For example, the space Vs can range from 1 nanometer to 0.1 meters.

In one example, the vanes 204 have a shape to enhance, induce, or both, capillary action of the liquid of the liquid-gas mixture. For example, the vanes 204 can be sloped, curved, teardrop-shaped, hemi-spherical, tapered, combinations thereof, and the like. In another example, the vanes 204 can be a polyhedron. The shape can enhance capillary action by decreasing the space Vs. For example, a tapered vane can be wider at the liquid end 206 thereby enhancing capillary action due to the decreased space Vs between successive or consecutive vanes 204.

The thickness of the vanes 204 can be selected to enhance capillary action, reduce liquid loss (such as that adhered to a front portion of a vane), combinations thereof, and the like. The thickness of the vanes 204 can enhance capillary action by decreasing the space Vs, as discussed above. The thickness of the vanes 204 can reduce liquid loss by varying the amount of vane surface area facing the inlet line 104 from which the liquid is expelled. For example, there is less surface area facing the return line inlet 108 for thinner vanes to which the liquid-gas mixture can adhere. The thickness, for example, can range from 0.01 mm to 100 mm. As another example, the thickness can the same as a metal foil, a metal sheet, or a metal plate.

Figure 2C:
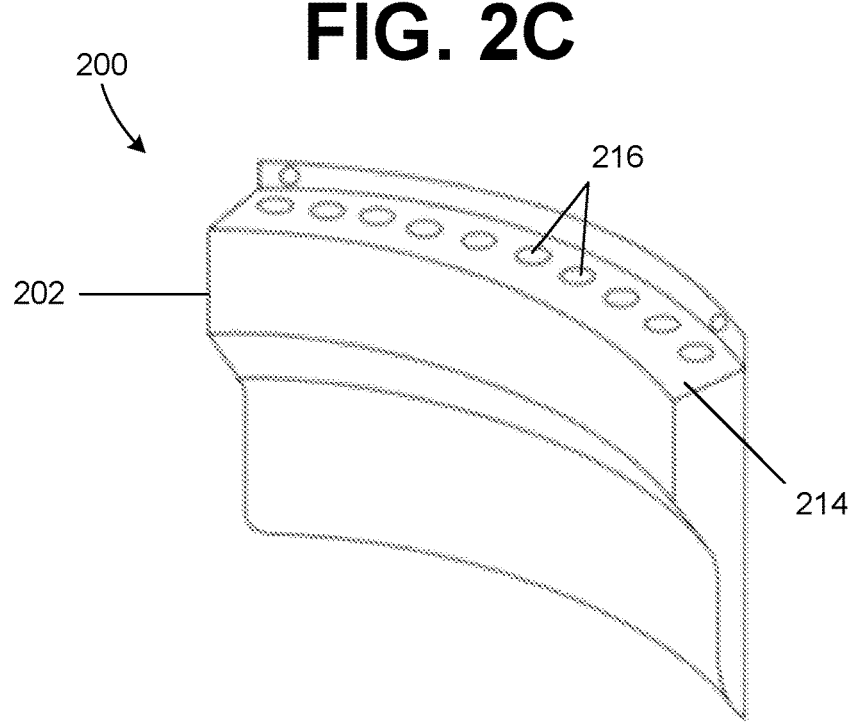
FIG. 2C illustrates an isometric view of the example diffuser.

In the example shown in FIG. 2C, the diffuser 200 includes a top 214 having multiple holes 216. The holes 216 permit the gas component of the liquid-gas mixture, once separated, to vent away from the liquid component. The top 214 with multiple holes 216 can be used in conditions where bubbles do not get stuck in the holes due to surface tension, such as when acceleration is equal to or greater than 0.1 g, where g is the gravitation acceleration on Earth. The bubbles do not get stuck in the holes 216 because the buoyancy force exerted on the bubbles is greater than a force exerted on the bubbles by the holes 216 (i.e., buoyancy force pushes the bubbles through the holes 216), the size of bubbles is less than the size of holes 216, or both. Regarding the size of the bubbles, bubbles formed in acceleration greater than or equal to 0.1 can be limited in size based on the buoyancy force-once the bubble reaches a given size, the buoyancy force pushes the bubble upwards.

In one example, the diffuser 200 includes a flange 210 having one or more openings 212. The flange 210 can be directly connected with the gas end 208 by welding, adhesion, molding, or the like. The flange 210 can be indirectly connected with the gas end 208 by an intermediary piece, including the top 214 or a component adjoining the flange 210 and the gas end 208. The flange 210 permits the diffuser 200 to be attached to an inner wall of the tank 102. For example, the diffuser 200 can be attached to the tank 102 with screws, nails, rivets, clips, bolts, pins, combinations thereof, and the like.

Figure 2D:
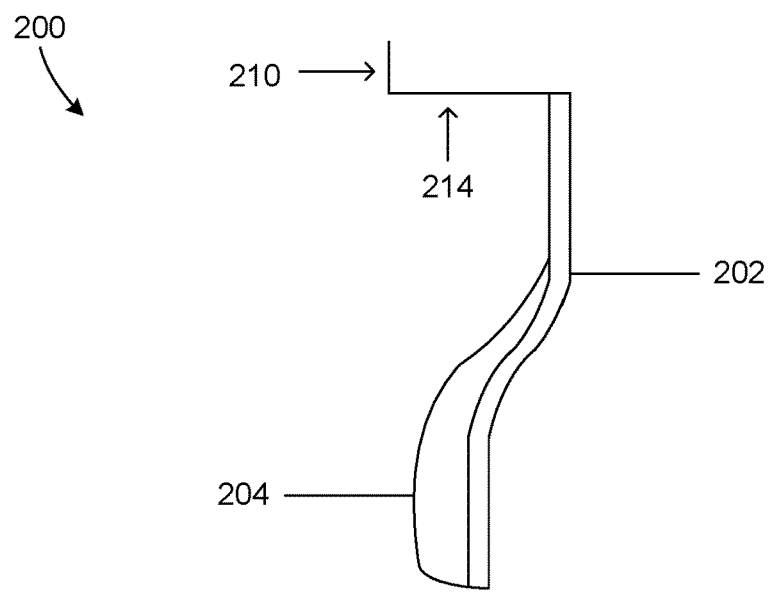
FIG. 2D illustrates a side view of the example diffuser.

As shown in FIG. 2D, the diffuser 200 has a cross-section profile of a "lazy S" or an "elongated S." This shape provides the desired contours and component positioning for the diffuser 200, while providing a lower total mass of the diffuser 200 by reducing or eliminating unnecessary or undesired bulk. For example, an L-shape can have extra material at or near the side of the liquid end 206 not facing the return line 206. That extra material is only present structurally but does not provide any additional functional features. Therefore, removing the non-desired portion of the material reduces the mass and forms the "lazy S" or the "elongated S."

However, additional shapes and configurations can be employed when it is desirous or necessary to do so. For example, the diffuser 200 can have rectangular shape more proximal to the gas end 208 and an enlarged or extended polygon or polyhedron shape more proximal to the liquid end 206.

The diffuser 200 can be composed of any appropriate material. For example, the diffuser 200 can be composed of a metal, an alloy, a ceramic, a polymer, combinations or multiples thereof, and the like. The diffuser 200 can be manufactured by any appropriate method. For example, the diffuser 200 can be manufactured by additive manufacturing, machining, casting, molding, forming, joining, combinations or multiples thereof, and the like.

Returning to FIG. 1B, the dashed line, as seen in magnified view 106, represents a liquid-gas mixture being returned to the tank 102 via the return line 104 through the return line inlet 108. The dotted line represents the gas component of the liquid-gas mixture. The dot-dashed line represents the liquid component of the liquid-gas mixture.

The liquid-gas mixture enters the tank 102 and contacts, collides with, or otherwise interacts with the wall 202 of the diffuser 200. The gas component of the liquid-gas mixture separates from the liquid component, such as by buoyancy force, and flows toward the gas end 208. The one or more characteristics of the liquid component, such as surface tension or polarity, causes the liquid component to flow toward or be drawn to the liquid end 206 of the diffuser 200 via capillary action of the multiple vanes 204.

In one example, the liquid that reaches the edge of the liquid end 206 flows directly into the liquid stored within the tank 102 or into a storage portion of the tank 102. In another example, the diffuser 200 is placed close enough to the inner wall of the tank 102 so that the liquid having reached the edge of the liquid end 206 transfers to the inner wall of the tank 102, such as by capillary action, adhesive force, or the like. The liquid then flows to any additional liquid being stored within the tank 102 or into the storage portion of the tank 102. Having the liquid accumulate on and flow from the inner wall of the tank 102 can reduce or eliminate sloshing caused by returned liquid (i.e., droplets are no longer disturbing the liquid). The distance from the inner wall of the tank 102 to the closest portion of one or more vanes 204, for example, can range from 1 nanometer to 0.1 meters.

The diffuser 200 can also reduce or eliminate slosh within the tank 102 by acting as a barrier to attenuate the amplitude and amount of waves generated by liquid movement. Furthermore, the diffuser 200 can reduce an overturning moment which is generated by the movement of the liquid. The overturning moment is one or more applied moments or forces which can destabilize or increase rotation about a base or center of mass, which is undesirable for propulsion systems. Reducing the overturning moment decreases destabilization or rotation or the likelihood thereof.

In one example, the degree of curvature of the diffuser 200 is equal to the degree of curvature of an inner wall of the tank 102.

Figure 3A:
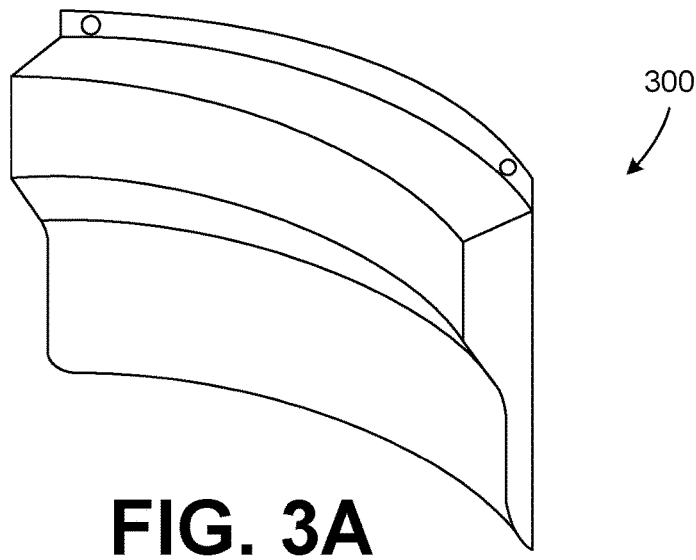
FIGS. 3A-3C illustrate diffusers with example tops.

FIG. 3A shows an example diffuser. A diffuser 300 is similar to the diffuser 200, except the diffuser 300 includes an open top. The open top can be used in conditions where acceleration is less than 0.1 g so that bubbles are not trapped in the apertures due to surface tension, where g is the gravitational acceleration on Earth. For example, the size of bubbles can grow to more than the size of the top holes due to a reduced buoyancy force which typically regulate bubble size in higher acceleration environments. As another example, the surface tension of the bubble can be less than in higher acceleration environments thereby reducing the capillary action provided by the diffuser 300 and causing the bubble to adhere to one of the holes 216 via an adhesive force. By removing the holes 216 and providing the open top, the adhesive or cohesive forces exerted on the bubble are reduced, and the capillary action of the diffuser 300 exceeds the adhesive or cohesive forces.

Figure 3B:
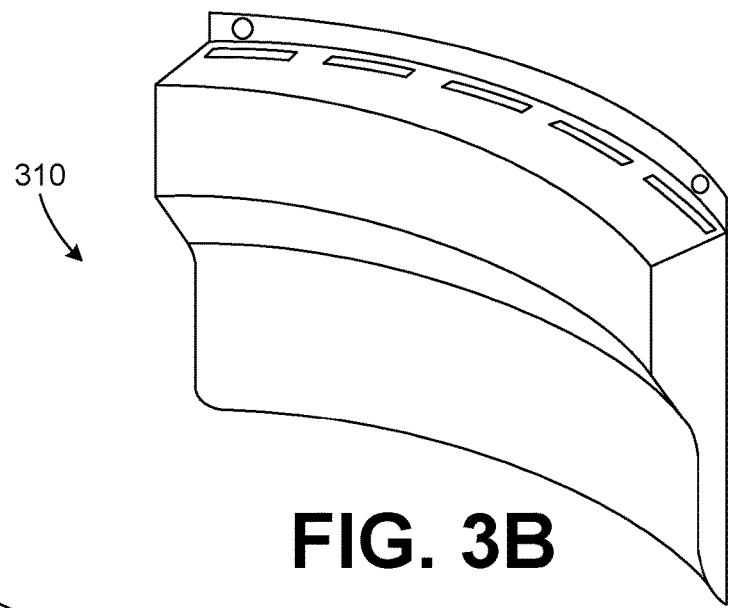
Figure 3C:
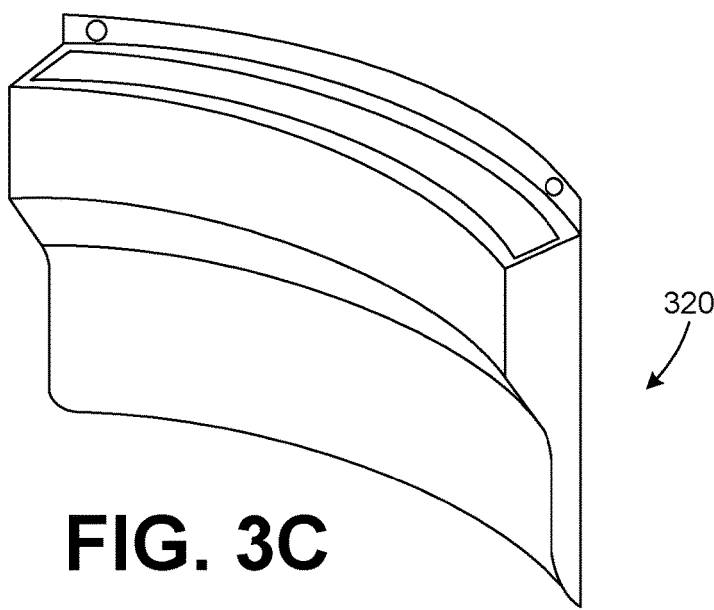

FIGS. 3B-3C show example diffuser with different tops. A diffuser 310 is similar to the diffuser 200, except the diffuser 310 includes one or more slits. A diffuser 320 is similar to the diffuser 200, except the diffuser 300 includes a substantially open top. The substantially open top includes a single opening with a lip, such as to connect to the flange 210.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific embodiments or examples are presented by way of examples for purposes of illustration and description. They are not intended to be exhaustive of or to limit this disclosure to the precise forms described. Many modifications and variations are possible in view of the above teachings. The embodiments or examples are shown and described in order to best explain the principles of this disclosure and practical applications, to thereby enable others skilled in the art to best utilize this disclosure and various embodiments or examples with various modifications as are suited to the particular use contemplated. It is intended that the scope of this disclosure be defined by the following claims and their equivalents.

What is claimed is:

1. A system, comprising:
    a tank comprising a return line inlet; and
    a diffuser sized to cover the return line inlet and located within the tank proximal to the return line inlet, the diffuser comprising:
        a wall comprising a gas end and a liquid end,
        multiple vanes partially extending from the liquid end to the gas end, and
        a space between consecutive vanes of the multiple vanes, wherein the space is configured to induce liquid flow by capillary action based on one or more characteristics of a liquid component of a recirculated liquid.

2. The system of claim 1, further comprising a return line connected to the tank at the return line inlet.

3. The system of claim 2, wherein the return line extends in a direction opposite the diffuser.

4. The system of claim 1, the diffuser and the return line inlet having the same size.

5. The system of claim 1, the diffuser being larger than the return line inlet.

6. The system of claim 1, wherein the space between the consecutive vanes is between about 1 nanometer and 0.1 meters.

7. The system of claim 1, wherein the one or more characteristics includes one or both of surface tension or polarity of the liquid component.

8. The system of claim 1, wherein the gas end is open.

9. The system of claim 1, wherein the gas end comprises one or more vents.

10. The system of claim 9, wherein the one or more vents includes a hole, a slit, or both.

11. The system of claim 1, the gas end further comprising a flange comprising openings to adjoin the diffuser to an inner wall of the tank.

12. The system of claim 1, wherein the vanes of the diffuser and an inner wall of the tank are spaced apart to induce capillary action on a liquid component of the recirculated liquid flowing from the diffuser to the inner wall.

13. The system of claim 1, wherein the vanes extend outwardly from the wall.

14. The system of claim 1, wherein a side of the wall comprising the vanes faces the return line inlet.

15. The system of claim 1, the diffuser and an inner wall of the tank having the same degree of curvature.

16. A diffuser sized to cover a return line inlet of a tank the diffuser comprising:
    a wall comprising a gas end and a liquid end;
    multiple vanes partially extending from the liquid end to the gas end; and
    a space between consecutive vanes of the multiple vanes, wherein the space is configured to induce liquid flow by capillary action based on one or more characteristics of a liquid component of a recirculated liquid.

17. The diffuser of claim 16, wherein the wall is configured to cover the entirety of the return line inlet.

18. The diffuser of claim 16, wherein the wall is configured to cover more than the entirety of the return line inlet.

19. The diffuser of claim 16, wherein the one or more characteristics includes one or both of the surface tension or polarity of the liquid component.

20. The diffuser of claim 16, wherein the gas end is open.

21. The diffuser of claim 16, wherein the gas end comprises one or more vents.

22. The diffuser of claim 21, wherein the one or more vents are a hole, a slit, or both.

23. The diffuser of claim 16, wherein the gas end further comprising a flange comprising openings.

24. The diffuser of claim 16, wherein the vanes are configured to extend outwardly from the wall.

* * * * *